Jan. 15, 1963 S. A. McGAVERN 3,073,887
CABLE VIBRATION DAMPER
Filed Dec. 5, 1960

INVENTOR.
SANFORD A. McGAVERN
BY
Lockwood, Woodard, Smith & Weikart
Attorneys

United States Patent Office 3,073,887
Patented Jan. 15, 1963

3,073,887
CABLE VIBRATION DAMPER
Sanford A. McGavern, Indianapolis, Ind., assignor to Schwitzer Corporation, Indianapolis, Ind., a corporation of Indiana
Filed Dec. 5, 1960, Ser. No. 73,916
6 Claims. (Cl. 174—42)

This invention is related generally to vibration dampers and more particularly to means for suppressing vibration in suspended cables or the like.

It is well known that wires or cables suspended between supports spaced a considerable distance apart are subject to the generation of vibrations as a result of wind. These vibrations are sometimes called aeolian vibrations and can be particularly troublesome in power transmission lines suspended from spaced towers.

One type of wind induced motion or vibration exists when the cable is subjected to steady winds, the vibrations varying with wind speed, cable weight and cable tension. Average vibration frequency ranges between ten to one hundred cycles per second, and distances between node points may vary from one and one-half to twenty-five feet. The cable motion referred to above, if unchecked and permitted to reach the cable support points, causes the cable to flex back and forth through a zero position at the support point thereby inducing fatigue in the cable metal. The more frequent use of aluminum cables has increased the need for minimizing this flexing. If the vibrations are permitted to enter the support points, they will be transmitted to the supporting structure such as a tower and may fatigue the tower, generate tower element resonance, and shake loose nuts, bolts, rivets and the like. Aside from the effects just mentioned, if the vibrations are unchecked, their amplitude may increase or build up should condtions of resonance occur.

It is an object of the present invention to provide means for avoiding damage from wind induced vibrations in suspended cables or the like.

It is a further object of the present invention to provide means for eliminating vibration waves from suspended cables.

It is a still further object of this invention to provide means for converting vibrational energy taken from suspended cables into heat energy.

It is a still further object of this invention to provide means for accomplishing the foregoing objects and having optimum damping characteristics for an extended period of time.

It is a still further object of this invention to provide a vibration damper for suspended cables in which the damping characteristic remains substantially unchanged or improves during the life of the damper.

It is a still further object of this invention to provide a vibration damper for cables embodying an elastic material in which the damping is achieved by applying primarily a shearing stress to the elastic material.

According to the present invention a damper is provided which, when applied to a suspended cable near the end of the span, will take the mechanical energy of vibration from the cable and convert it to heat. The damper is provided with a generally cylindrical body portion of an elastic material such as rubber or other elastomer having an aperture extending axially therethrough to receive a cable. A longitudinal seam is provided in one wall of the body portion whereby the damper can be placed on the cable for clamping in position. The body portion has an arm extending laterally from each side thereof and integral therewith. These arms are also referred to hereinafter as springs. The outer margins of these arms are substantially parallel to the axis of the aperture through the body portion. Another pair of arms is provided. Each of these arms is joined at the outer margin of one of the aforesaid arms and extends in spaced relation therebelow and substantially parallel thereto and toward the other arm of the second pair. The latter two arms are joined by a portion integral therewith and containing an inertia member which is usually made of a relatively heavy material such as steel.

The full nature of the invention will be understood from the accompanying drawings and the following description and the claims.

Figure 1:
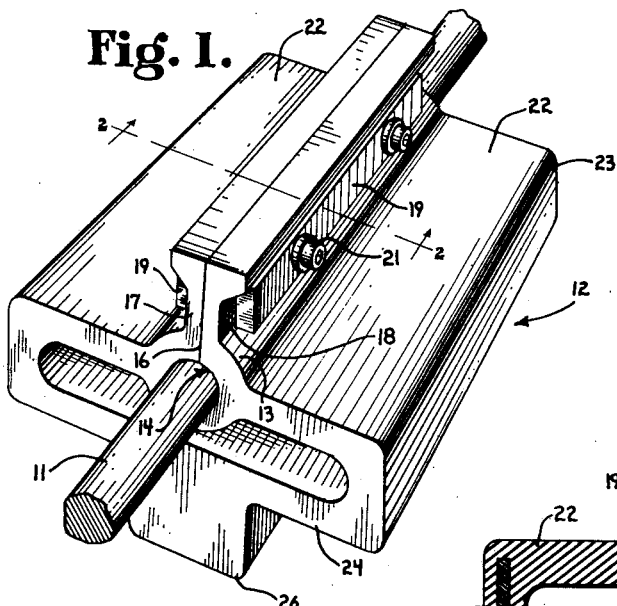
FIG. 1 is a perspective view of a preferred embodiment of this invention.

Referring to FIG. 1, there is shown a cable 11 on which is mounted the damper designated generally by reference numeral 12. The damper has a cylindrical body portion 13 having an aperture 14 therein through which the cable 11 passes. The body portion has one wall split at rift 16 to provide means for placing the damper on the cable. A flange 17 joins the body portion 13 adjacent each side of the rift 16. Each flange has a longitudinal recess 18 therein to receive the clamp bars 19 drawn together by the screws 21 to fasten the damper securely to the cable.

An arm 22 integral with the body portion extends laterally therefrom on each side in a plane. The outer margins 23 of these arms are substantially parallel to the axis of the aperture 14. A lower arm 24 is joined to each of the upper arms adjacent the outer margins thereof by a thick section of the elastic material of which the damper is made. The lower arms extend toward each other and generally in a plane parallel to and below the plane of the upper arms. A depending portion 26 coextensive with the arms 24 houses an inertia member (not shown in FIG. 1).

Figure 2:
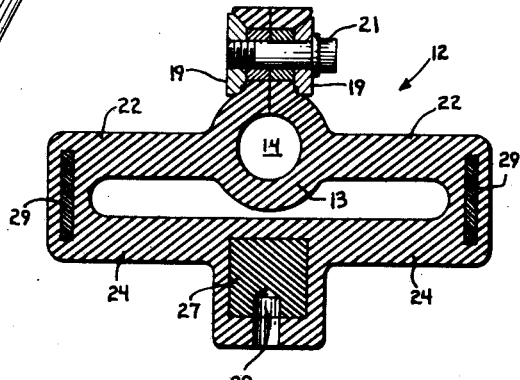
FIG. 2 is a cross section of the preferred embodiment taken along the lines 2—2 of FIG. 1.

FIG. 2 which is a section taken along the lines 2—2 of FIG. 1 shows the inertia member 27 enclosed by the elastic material of the damper. The inertia member 27 which is usually made of metal has means, such as for example the holes 28 in the bottom thereof, whereby it can be located in a mold when the damper is molded. Such means might be omitted where the inertia member is adhered in place other than by molding the elastic material about it. For example, a cavity could be provided in portion 26 when the damper is molded. Then the portion could be cut to obtain a longitudinal rift to admit the inertia member to the cavity where it could then be adhered in place by any suitable bonding material.

Shown also in FIG. 2 are metal inserts 29 which keep the side walls from bending and keep their principal stress that of shear in the upper and lower springs.

Figure 3:
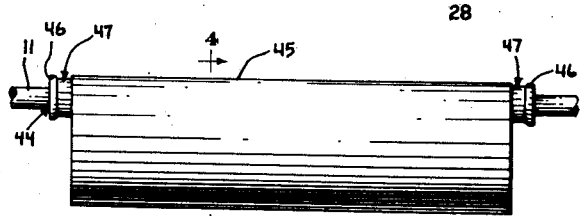
FIG. 3 is a side view of another embodiment of this invention.

Referring to FIG. 3 which is a side view of another embodiment of this invention the cable 11 passes through an aperture 44 passing through the main body portion of the damper 45. This portion of the damper has a pair of extending flanged annular bosses 46 around which clamps 47 are employed to fasten the damper to the cable.

Figure 4:
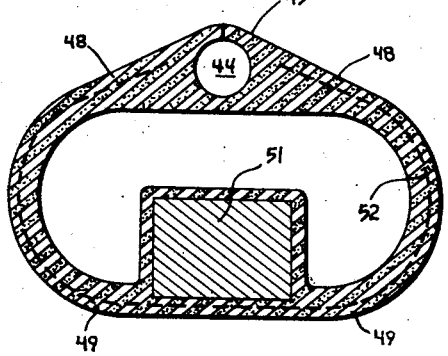
FIG. 4 is a cross section taken along the lines 4—4 of FIG. 3.

FIG. 4 which is a section taken along the lines 4—4 of FIG. 3 illustrates that the arms 48 adjacent the main body portion 45 do not extend in a plane but are generally curved to provide a smooth transition into the lower arms 49 which join at the portion carrying the inertia member 51. A fabric reinforcement 52 may be employed if desired.

In use the vibration damper is fastened to a cable a short distance from a cable support. The vibration induced in the cable by wind produces a motion of the damper and the inertia weight is forced to move also. However, the elastic material of the damper permits the inertia weight to have a slightly different motion from that of the cable and this results in application of shear stress to the elastic material. This motion is made several times as great as that of the cable itself at the damper location by virtue of the structure of the damper and accordingly considerably more energy of vibration can be converted to heat than would be possible without this amplification. The damper is tuned so that it will damp vibrations from low frequencies through the high frequencies which might occur.

Conventional cable vibration dampers are suspended at what is, in effect, a single point on the cable. The primary disadvantage of this arrangement is that vibration nodes can occur at various places along a cable and if they happen to occur where the damper is suspended, the damper would be ineffective. It should be noted that the structure of the present invention causes it to extend along a length of the cable, so that regardless of where a node point occurs on the cable the damper will respond to cable vibration. Because of this feature and the motion amplification characteristic described above, the damper of this invention is effective regardless of where node points occur on the cable.

Where a type of spring system is used in a damper, relatively large static deflections are required to reduce the natural frequency of the damper to a low speed. The large initial deflection is increased by drift or set which occurs on a continuing basis over the life of the damper.

By using the elastic material in shear, optimum damping can be obtained throughout the life of the damper. In the present invention the laterally extending arm structure with the arm ends joined together provide an effect somewhat similar to that obtained by employment of two springs in series, permitting large static deflections capable of damping low frequency vibrations while at the same time avoiding excessive elongation of elastic elements and maintaining primarily a shear stress thereon. Thus, the present invention has damping characteristics which remain substantially unchanged or improve during the life of the damper.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

What is claimed is:

1. A cable vibration damper comprising: a body having means for attachment to a cable, a first pair of resilient arms formed of a material having substantial hysteresis or internal friction, said arms extending laterally from said body in a curve and joining a second pair of resilient arms formed of said material and extending toward each other and joined by a portion carrying an inertia weight whereby the mechanical energy generated by vibratory motions of the cable is dissipated in heat generated by the internal friction in said arms.

2. A cable vibration damper comprising: a body having means for attachment to a cable; a first pair of resilient arms formed of a material having substantial hysteresis or internal friction, said arms extending generally laterally from said body; a second pair of resilient arms formed of said material and joined to said first pair, said second pair of arms meeting to form a junction carrying an inertia weight whereby the mechanical energy generated by vibratory motions of the cable is dissipated in heat generated by the internal friction in said arms.

3. A cable vibration damper comprising: a body having means for attachment to a cable; a first pair of resilient arms formed of a material having substantial hysteresis of internal friction, said arms extending laterally from said body; a second pair of resilient arms formed of said material and having an arm joined to each arm of said first pair, the arms of said second pair extending toward each other below said first pair of arms and joined by a portion carrying an inertia weight whereby the mechanical energy generated by vibratory motion of the cable is dissipated in heat generated by the internal friction in said arms.

4. A vibration damper for suspended cables or the like comprising: a body portion having means to secure the damper on a cable; a first pair of resilient arms integral with said body portion and extending laterally outwardly from opposite sides of said body portion in a plane; a second pair of resilient arms integral with said first pair, the junctions of said arms defining the outer margins of the arms, said arms of said second pair extending toward each other in spaced relation to said first pair and joined to each other adjacent a receptacle for an inertia weight, said arms being formed of elastic material having substantial hysteresis or internal friction; and an inertia weight disposed in said receptacle whereby the mechanical energy generated by vibratory motion of the cable is dissipated in heat generated by the internal friction in said arms.

5. A vibration damper for suspended cables or the like comprising: a body portion having means to secure the damper on a cable; a first pair of resilient arms integral with said body portion and extending laterally outwardly from opposite sides of said body portion in a plane and having outer margins substantially parallel to the axis of said body portion; a second pair of resilient arms integral with said first pair, the junctions of said arms defining the outer margins of the arms, said arms of said second pair extending toward each other in spaced relation to said first pair and joined to each other adjacent a receptacle for an interia weight, said arms being formed of an elastic material having substantial hysteresis or internal friction; and an inertia weight disposed in said receptacle whereby the mechanical energy generated by vibratory motion of the cable is dissipated in heat generated by the internal friction in said arms.

6. A cable vibration damper comprising: a body having means for attachment to a cable; a first pair of resilient arms extending generally laterally from said body; a second pair of resilient arms joined to said first pair and joined by a portion carrying an inertia weight, said arms being formed of elastic material having substantial hysteresis or internal friction, whereby the mechanical energy generated by vibratory motion of the cable is dissipated in heat generated by the internal friction in said arms, and rigid means disposed proximate the junctions of said first and second pair of arms to restrict the principal stress generated by vibratory motions to that of a shear character in said arms.

References Cited in the file of this patent

UNITED STATES PATENTS

| | | |
|---|---|---|
| 1,884,036 | Malone | Oct. 25, 1932 |
| 2,694,101 | Shuhart | Nov. 9, 1954 |